United States Patent [19]
Gilbert et al.

[11] Patent Number: 5,553,993
[45] Date of Patent: Sep. 10, 1996

[54] MECHANISM FOR ROTATING A TREE-FELLING IMPLEMENT AND TREE-FELLING IMPLEMENT THEREWITH

[75] Inventors: Sylvain Gilbert, 1641 boul. St-Dominique, Roberval, Canada, G8H 2P1; Michel Taillon, St-Félicien, Canada

[73] Assignee: Sylvain Gilbert, Robervat, Canada

[21] Appl. No.: 419,713

[22] Filed: Apr. 10, 1995

[51] Int. Cl.⁶ .................................... A01G 23/08
[52] U.S. Cl. .................. 414/739; 144/335; 144/3 D; 414/680; 414/729
[58] Field of Search ................ 144/3 D, 335, 144/336; 414/680, 729, 734, 743, 695.7, 685, 722

[56] References Cited

U.S. PATENT DOCUMENTS

| | | |
|---|---|---|
| 2,656,059 | 10/1953 | Troyer ............................. 414/743 |
| 2,681,739 | 6/1954 | Gokey . |
| 3,027,026 | 3/1962 | Couquet . |
| 3,081,891 | 3/1963 | Przybylski . |
| 3,197,049 | 7/1965 | Schwing . |
| 3,217,910 | 11/1965 | Waite . |
| 3,278,046 | 10/1966 | Shumaker . |
| 3,495,727 | 2/1970 | Long . |
| 3,550,794 | 12/1970 | Suverkrop . |
| 3,796,331 | 3/1974 | Dutton . |
| 3,840,132 | 10/1974 | Howells, Jr. et al. . |
| 4,127,152 | 11/1978 | Larson et al. ...................... 144/3 D |
| 4,134,505 | 1/1979 | Watanabe . |
| 4,412,569 | 11/1983 | Barnett et al. ..................... 144/3 D |
| 4,552,191 | 11/1985 | Kuusilinna ........................ 144/3 D |
| 5,073,080 | 12/1991 | Blum ................................. 414/739 |
| 5,074,740 | 12/1991 | Weigel .............................. 414/550 |
| 5,140,760 | 8/1992 | Mannbro ........................... 414/722 |
| 5,377,730 | 1/1995 | Hamilton .......................... 144/3 D |
| 5,378,852 | 1/1995 | Manor ............................... 144/3 D |
| 5,441,090 | 8/1995 | Hill et al. .......................... 144/3 D |

*Primary Examiner*—Karen B. Merritt
*Assistant Examiner*—Gregory A. Morse
*Attorney, Agent, or Firm*—Merchant, Gould, Smith, Edell, Welter & Schmidt, P.A.

[57] ABSTRACT

The mechanism is used for rotating a tree-felling implement rotatably mounted with a pivot to the distal end of the boom of a logging vehicle. The mechanism, the tree-felling implement, the boom and the logging vehicle form a tree-felling machine controlled by an operator and used on logging sites. The mechanism has a pinion coaxial with the implement pivot and fixed in rotation with reference to the distal end of the boom. An arc-shaped rack is rotatably mounted on the frame of the implement by a rack pivot in spaced relationship with the pinion. The rack is in mesh with the pinion and hydraulic actuators are provided on the frame of the implement for swaying the rack and thereby rotating the implement with reference to the boom. Such mechanism is capable of rotating the tree-felling implement with reference to the boom plane in both directions and according to a much wider range angle than the prior art mechanisms.

7 Claims, 4 Drawing Sheets

MECHANISM FOR ROTATING A TREE-FELLING IMPLEMENT AND TREE-FELLING IMPLEMENT THEREWITH

FIELD OF THE INVENTION

The present invention relates to a mechanism for rotating a tree-felling implement rotatably mounted at the distal end of the boom of a logging vehicle. The mechanism, the tree-felling implement, the boom and the logging vehicle form a tree-felling machine controlled by an operator and is to be used on logging sites.

BACKGROUND OF THE INVENTION

Tree-felling machines are used in mechanized tree harvesting for cutting down trees instead of using a manual chain saw. Each machine comprises a logging vehicle with a boom at the end of which is provided a tree-felling implement. In use, to cut down an adjacent tree, the operator moves the implement towards the base of the tree. The implement then grabs a trunk with a set of hydraulically actuated arms and cuts the trunk at the base with a saw or a felling shear. The trunk is laid down on the ground or in a truck afterwards. Some implements can also remove branches from the trunk while still grabbing it, otherwise branches may be removed by another machine or a manual chain saw, or even not be removed at all.

Because the boom is generally moving only in the vertical plane, the implement has to be able to rotate with reference to the boom plane so that it may grab an inclined or curved tree, or a tree laying on the ground. In conventional tree-felling machines, the implement is rotated by means of a single oblique hydraulic actuator having one end operatively attached to the boom and another end operatively attached to the implement. With such embodiment, the implement may not be rotated around its pivot according to a wide range angle and this alters greatly the flexibility of the machine. In some situations, the operator may have to move the machine around the tree until a suitable angle is found, which may not be always possible because of the usually soft soil and all the obstacles in a logging site. This therefore lowers productivity and adds unnecessary wear to the machine parts.

SUMMARY OF THE INVENTION

The object of the present invention is to provide a simple and reliable mechanism for rotating a tree-felling implement, and a tree-felling implement with such mechanism. It is further an object of the present invention to provide a mechanism capable of rotating the implement with reference to the boom plane in both directions and according to a wide range angle.

More particularly, the object of the present invention is to provide a mechanism for rotating a tree-felling implement, the tree-felling implement comprising a frame rotatably connectable to a distal end of a boom of a logging vehicle by an implement pivot, the mechanism comprising:

a pinion coaxial with the implement pivot and fixed in rotation with reference to the distal end of the boom;

an arc-shaped rack rotatably mounted on the frame of the implement by a rack pivot in spaced relationship with the pinion, the rack being in mesh with the pinion; and actuating means provided on the frame of the implement for swaying the rack and thereby rotating the implement with reference to the boom.

It is also an object of the present invention to provide a tree-felling implement comprising:

a frame;

an implement pivot for rotatably connecting the frame to distal end of a boom of a logging vehicle;

a pinion coaxial with the implement pivot and fixed in rotation with reference to the distal end of the boom;

an arc-shaped rack rotatably mounted on the frame of the implement by a rack pivot in spaced relationship with the pinion, the rack being in mesh with the pinion; and actuating means provided on the frame of the implement for swaying the rack and thereby rotating the implement with reference to the boom.

A non restrictive description of a preferred embodiment will now be given with reference to the appended drawings.

DESCRIPTION OF A PREFERRED EMBODIMENT

REFERENCE NUMERALS

Figure 1:
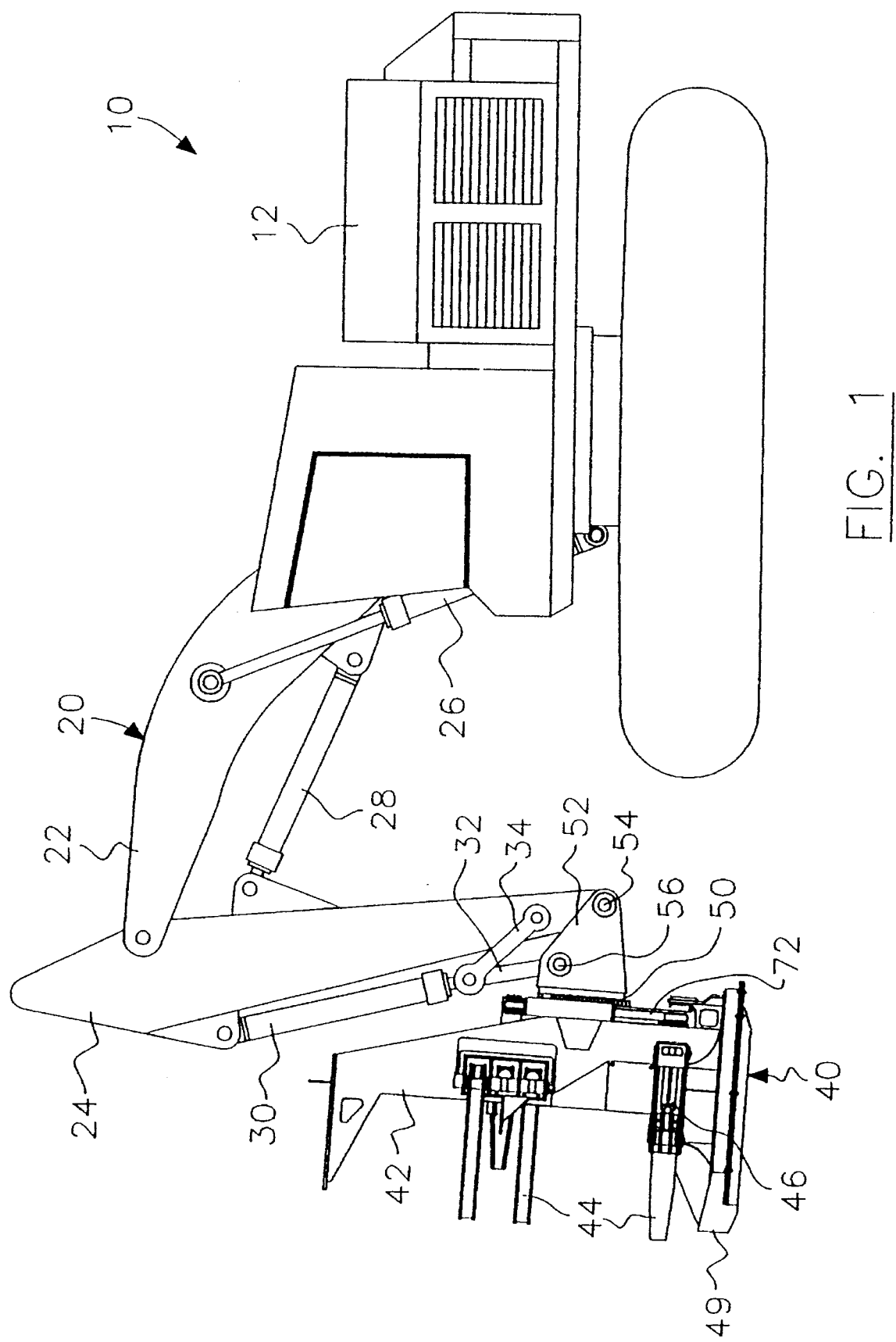
FIG. 1 is an elevational view of a logging vehicle with the tree-felling implement according to the present invention.
Figure 2:
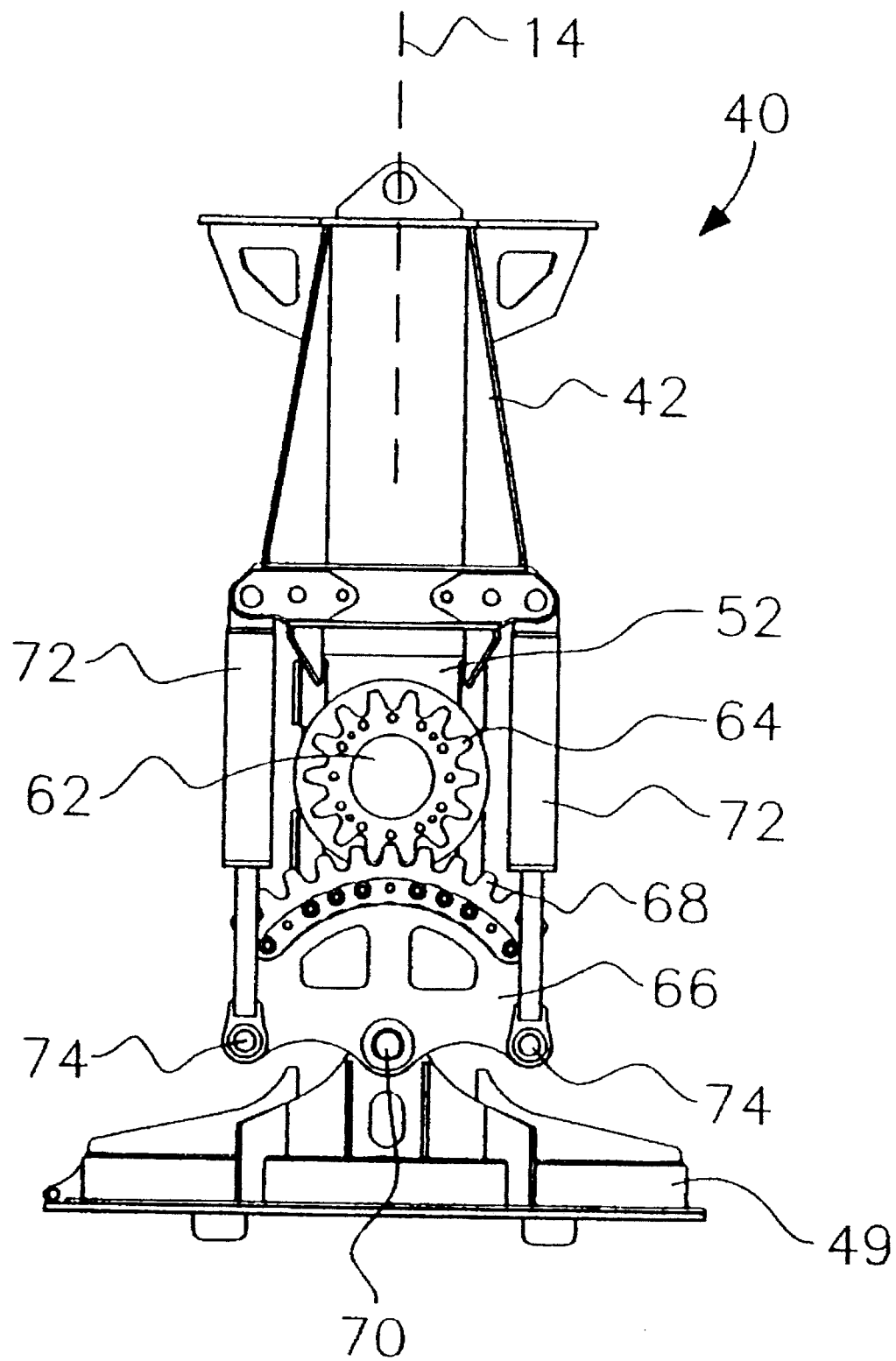
FIG. 2 is a rear view of the implement, showing the implement in a central position with reference to the boom axis.

The description and the drawings use the following reference numerals:

10 tree-felling machine
12 logging vehicle
14 boom plane
20 boom
22 proximal boom member
24 distal boom member
26 boom hydraulic actuator
28 boom hydraulic actuator
30 boom hydraulic actuator
32 first lever
34 second lever
40 tree-felling implement
42 frame
44 trunk grabbing arms
46 hydraulic actuators (of the trunk grabbing arms)
48 circular saw
49 protective casing
50 implement pivot
52 linking element
54 first pivot (of the boom linking element)
56 second pivot (of the boom linking element)
62 pinion
64 pinion teeth
66 arc-shaped rack
68 rack teeth 70 rack pivot
72 rack hydraulic actuators
74 rack lateral locations

GENERAL DESCRIPTION OF THE INVENTION

As shown in FIG. 1, the tree-felling machine (10) comprises a self-propelled logging vehicle (12) adapted for use on logging sites and controlled by an operator sitting inside a cabin thereof. As apparent for a person skilled in the art, many other kinds of logging vehicles can be used instead of the one illustrated in FIG. 1.

An articulated boom (20) is operatively mounted on the vehicle (12). This boom (20) is known as a felling boom or a tree boom. Its purpose is to allow movement of a tree-felling implement (40) in the vertical plane. The implement (40) is rotatably connected at the distal end of the boom (20) by means of an implement pivot (50). The boom (20) is described in details further in the text.

The tree-felling implement (40) is used for cutting down the trees instead of using a manual chain saw. In use, to cut down an adjacent tree, the operator moves the implement (40) towards the base of the tree. The implement (40) then grabs a trunk with a set of hydraulically actuated trunk grabbing arms (44) and cut the trunk at the base with a circular saw (48). Alternatively, a felling shear (not shown) may be used. The trunk is laid down on the ground or in a truck afterwards. The implement (40) is described in details further in the text.

Because the boom (20) is generally moving only in the vertical plane, hereinafter referred to as "the boom plane (14)", the implement (50) has to be able to rotate around the implement pivot (50) so that it may grab an inclined or curved tree, or a tree laying on the ground. The present invention provides a simple and reliable mechanism capable of rotating the implement (40) with reference to the boom plane (14) in both directions, clockwise and counterclockwise, and capable of having a wide range angle. Although the present invention allows the implement (40) to have range angles of 90° and over, one may choose to restrict the range angle to a value under 45° and use the mechanism of the present invention for its other advantages. Uneven extreme angles with reference to the boom plane (14) are also possible if desired. The actuating mechanism is described in details further in the text.

THE BOOM

The boom (20) comprises a proximal boom member (22) and a distal boom member (24) operatively connected to each other. The proximal boom member (22) is operatively connected to the vehicle (12) and is rotated by means of a hydraulic actuator (26) of the boom. The distal boom member (24) is rotated with reference to the proximal boom member (22) by means of a hydraulic actuator (28) of the boom. Specific construction details are known in the art of heavy machinery.

In addition to the movement in the vertical plane, the boom (20) may be articulated at this proximal end (not shown) for left and right rotations with reference to the vehicle (12). Alternatively, the vehicle (12) may be able to turn on itself, as it is the case for the one illustrated in FIG. 1.

The boom (20) comprises other elements that are described further in the text.

THE TREE-FELLING IMPLEMENT

Figure 3:
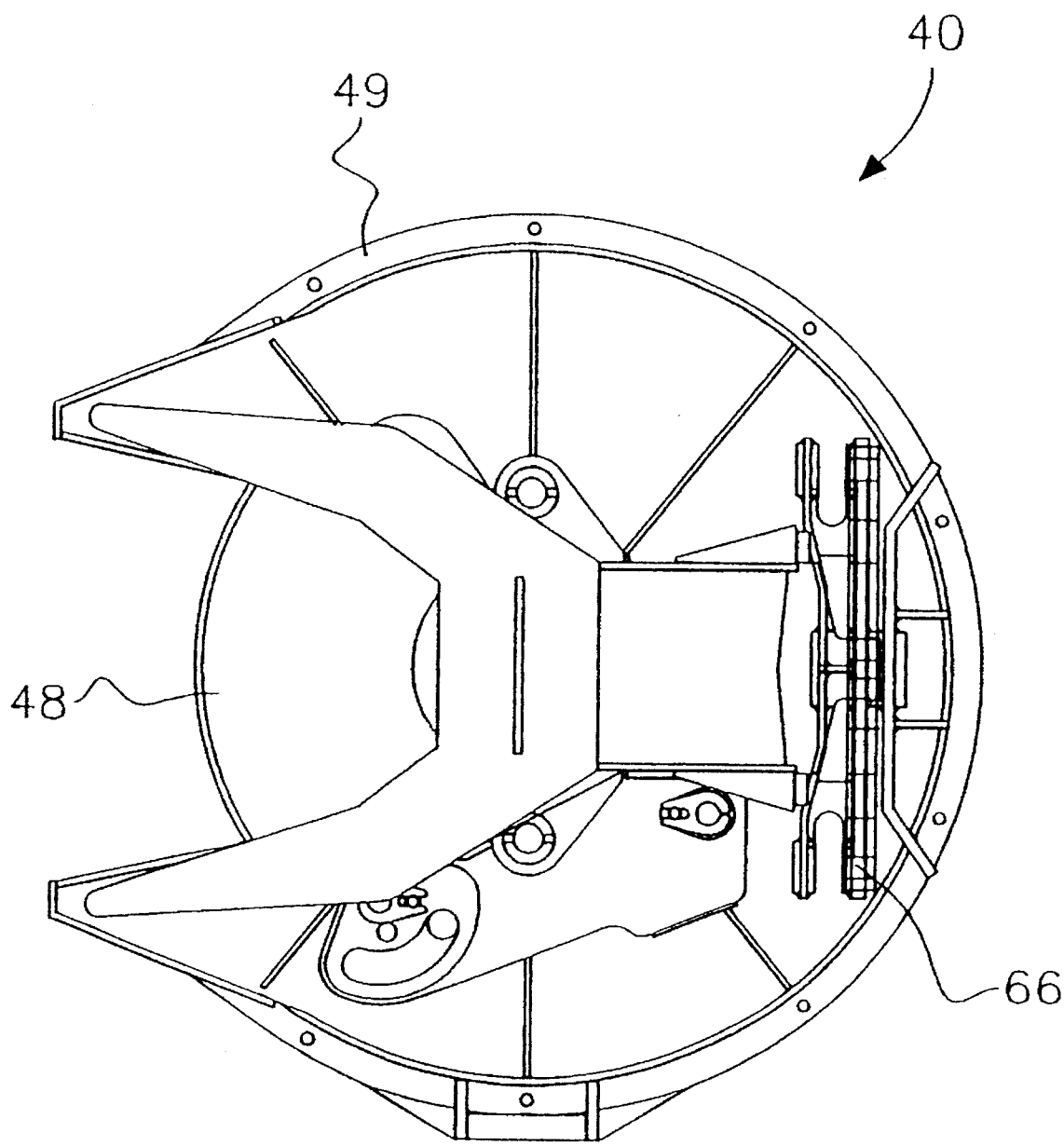
FIG. 3 is a top view of the implement in FIG. 2, shown without the pinion and the hydraulic actuators of the rack.
Figure 4:
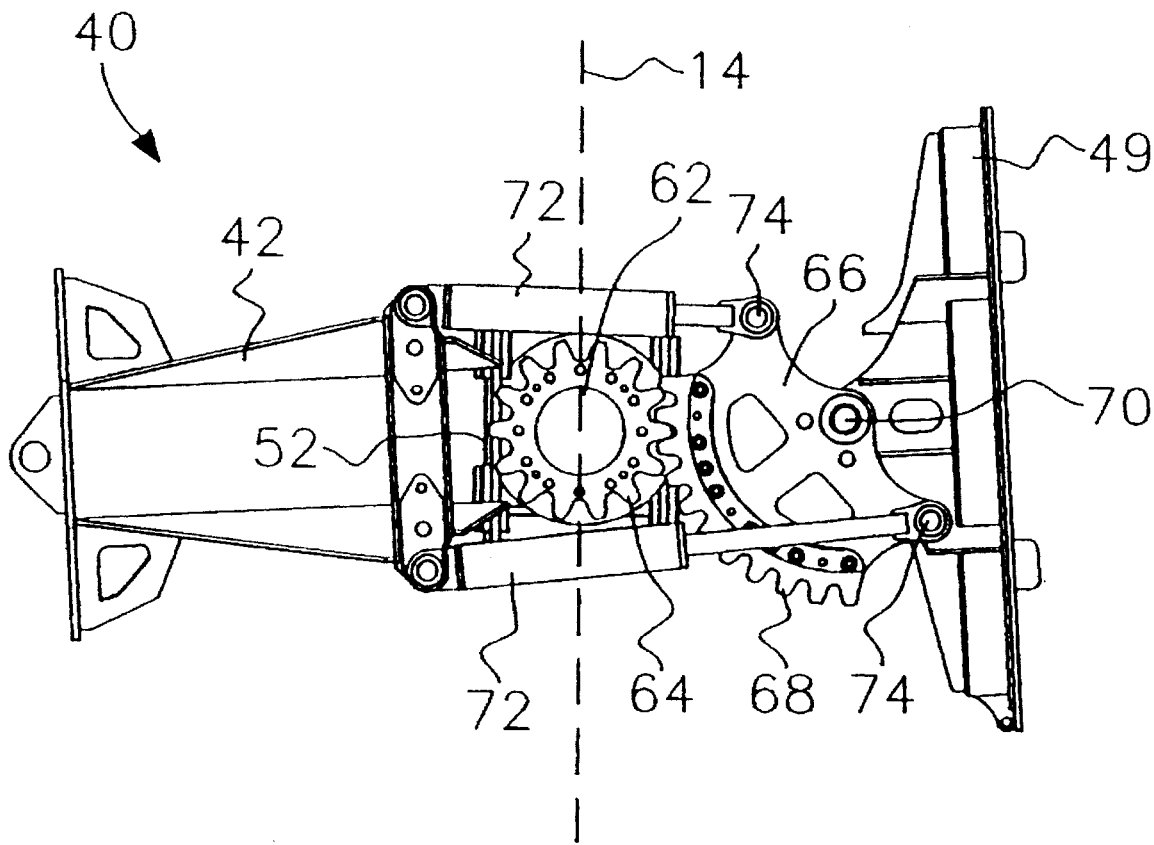
FIG. 4 is an elevational view of the implement shown in FIG. 2, showing the implement in an example of an extreme angular position.

The tree-felling implement (40) itself is a device known in the art. It comprises a main frame (42) on which is located a trunk grabbing means, such as the trunk grabbing arms (44) actuated by the hydraulic actuators (46). The implement further comprises a circular saw (48), as best shown in FIG. 3, and a protective casing (49) therefor. Other tree cutting means, such as a felling shear (not shown) may be used instead of the saw (48).

The implement pivot (50) is a bearing supporting the weight of the implement (40) and of a tree when one is in the implement (40). It comprises the usual parts for such a bearing, as apparent for a person skilled in the art.

THE ACTUATING MECHANISM FOR ROTATING THE IMPLEMENT

The actuating mechanism comprises a pinion (62) coaxial with the implement pivot (50), more precisely with the center of rotation thereof. The pinion (62) is fixed in rotation with reference to the distal end of the boom (20).

The mechanism further comprises an arc-shaped rack (66) rotatably mounted on the frame (42) of the implement (40) by a rack pivot (70) in spaced relationship with the pinion (62), more precisely its center. The rack pivot (70) is in spaced relationship with the center of the pinion (62) so that a virtual mechanical lever arm is defined. The rack (66) preferably has teeth (68) in mesh with corresponding teeth (64) on the pinion (62).

An actuating means is provided on the frame (42) of the implement (40) for swaying the rack (66). The actuating means preferably comprises two reciprocal hydraulic actuators (72) symmetrically disposed about the rack (66). The actuators (72) have one end operatively connected to the frame (42) of the implement (40), and another end operatively connected to the rack (66) on a respective lateral location (74) thereon with reference to the rack pivot (70). The lateral locations (74) are in spaced relationship with the rack pivot (70) for defining virtual mechanical lever arms by which the force applied by the actuators (72) is converted into a torque, itself transmitted to the pinion (62).

Upon activation of the actuators (74), which move reciprocally, they apply a force resulting in a torque that rotates the rack (66) around the rack pivot (70). Because the implement (40) is rotatably connected to the boom (20) and the pinion (62) is fixed in rotation with respect to the boom (20), the movement of the rack (66) rotates the whole implement (40) around the implement pivot (50).

Of course, other actuating mechanisms and arrangements are also possible. For example, the actuating means may comprise a hydraulic motor (not shown).

THE LINKING ELEMENT

The linking element (52) is used for rotatably connecting the implement (40) to the distal end of the distal boom member (24). According to a preferred embodiment, as shown in FIG. 1, the linking element (52) comprises a first pivot (54), for connecting the implement (40) to the boom (20). A second pivot (56) is provided, closer to the frame (42) than the first pivot (54) for rotatably connecting the implement (40) to an end of a first lever (32). The first lever (32) has an opposed end rotatably connected to a hydraulic actuator (30) of the boom. The same end of the first lever (32) is also rotatably connected to an end of a second lever (34). The second lever (34) has an opposed end rotatably connected to the boom (20). With this arrangement, the linking element (52) is moved in the boom plane (14) whenever the hydraulic actuator (30) is operated, thereby also moving the implement (40) in the boom plane (14).

SCOPE OF THE PRESENT DESCRIPTION

Although a preferred embodiment of the invention has been described in detail herein and illustrated in the accompanying drawings, it is to be understood that the invention is not limited to this precise embodiment and that various changes and modifications may be effected therein without departing from the scope or spirit of the invention.

What is claimed is:

1. A mechanism for rotating a tree-felling implement, the tree-felling implement comprising a frame rotatably connectable to a distal end of a boom of a logging vehicle by an implement pivot, the mechanism comprising:

a pinion coaxial with the implement pivot and fixed in rotation with reference to the distal end of the boom;

an arc-shaped rack rotatably mounted on the frame of the implement by a rack pivot in spaced relationship with the pinion, the rack being in mesh with the pinion; and actuating means provided on the frame of the implement for swaying the rack and thereby rotating the implement with reference to the boom.

2. A mechanism according to claim 1, wherein the actuating mechanism comprises at least one actuator having one end operatively connected to the frame of the implement, and another end operatively connected to the rack on a lateral location thereon with reference to the rack pivot.

3. A mechanism according to claim 1, wherein the actuating means comprises two reciprocal hydraulic actuators symmetrically disposed on the rack, the actuators having one end operatively connected to the frame of the implement, and another end operatively connected to the rack on a respective lateral location thereon with reference to the rack pivot.

4. A tree-felling implement comprising:

a frame;

an implement pivot for rotatably connecting the frame to a distal end of a boom of a logging vehicle;

a pinion coaxial with the implement pivot and fixed in rotation with reference to the distal end of the boom;

an arc-shaped rack rotatably mounted on the frame of the implement by a rack pivot in spaced relationship with the pinion, the rack being in mesh with the pinion; and actuating means provided on the frame of the implement for swaying the rack and thereby rotating the implement with reference to the boom.

5. A tree-felling implement according to claim 5, wherein the actuating mechanism comprises at least one actuator having one end operatively connected to the frame of the implement, and another end operatively connected to the rack on a lateral location thereon with reference to the rack pivot.

6. A tree-felling implement according to claim 5, wherein the actuating means comprises two reciprocal hydraulic actuators symmetrically disposed on the rack, the actuators having one end operatively connected to the frame of the implement, and another end operatively connected to the rack on a respective lateral location thereon with reference to the rack pivot.

7. A tree-felling implement according to claim 5, further comprising a linking element having a first pivot for rotatably connecting the implement to the distal end of the boom, and a second pivot closer to the frame than the first pivot for rotatably connecting the implement to an end of a first lever, the first lever having an opposed end rotatably connected to a hydraulic actuator of the boom and an end of a second lever, itself having an opposed end rotatably connected to the boom.

* * * * *

UNITED STATES PATENT AND TRADEMARK OFFICE
CERTIFICATE OF CORRECTION

PATENT NO. : 5,553,993

DATED : September 10, 1996

INVENTOR(S): Gilbert et al.

It is certified that error appears in the above-identified patent and that said Letters Patent is hereby corrected as shown below:

<u>TITLE PAGE</u>

[73], Assignee: "Robervat" should read --Roberval--

Col. 2, line 5: insert --a-- after the word "to"

Signed and Sealed this

Twenty-eighth Day of October, 1997

*Attest:*

BRUCE LEHMAN

*Attesting Officer*    *Commissioner of Patents and Trademarks*